US010663939B2

(12) United States Patent
Shiel

(10) Patent No.: US 10,663,939 B2
(45) Date of Patent: May 26, 2020

(54) DEVELOPMENT OF CERTAIN BUILDING DATA PROFILES AND THEIR USE IN AN AUTOMATED OPTIMIZATION METHOD TO REDUCE THERMAL ENERGY CONSUMPTION IN COMMERCIAL BUILDINGS DURING THE HEATING SEASON

(71) Applicant: Patrick Andrew Shiel, Dublin (IE)

(72) Inventor: Patrick Andrew Shiel, Dublin (IE)

(73) Assignee: Patrick Andrew Shiel, Dublin (IE)

( * ) Notice: Subject to any disclaimer, the term of this patent is extended or adjusted under 35 U.S.C. 154(b) by 0 days.

(21) Appl. No.: 16/195,941

(22) Filed: Nov. 20, 2018

(65) Prior Publication Data
US 2019/0187644 A1    Jun. 20, 2019

Related U.S. Application Data

(63) Continuation of application No. 15/066,681, filed on Mar. 10, 2016, now Pat. No. 10,168,681, which is a
(Continued)

(51) Int. Cl.
| | | |
|---|---|---|
| *G05B 19/042* | (2006.01) | |
| *G05B 19/10* | (2006.01) | |
| *F24D 19/10* | (2006.01) | |
| *G05B 13/04* | (2006.01) | |
| *G05B 15/02* | (2006.01) | |
| *G06F 17/18* | (2006.01) | |
| *G06Q 10/04* | (2012.01) | |
| *G06Q 10/06* | (2012.01) | |
| *G06Q 50/06* | (2012.01) | |

(Continued)

(52) U.S. Cl.
CPC ....... *G05B 19/042* (2013.01); *F24D 19/1048* (2013.01); *F24D 19/1081* (2013.01); *G05B 13/04* (2013.01); *G05B 15/02* (2013.01); *G05B 19/102* (2013.01); *G06F 17/18* (2013.01); *G06Q 10/04* (2013.01); *G06Q 10/06* (2013.01); *G06Q 50/06* (2013.01); *G06Q 50/16* (2013.01); *F24F 11/46* (2018.01); *F24F 2130/00* (2018.01); *F24F 2130/10* (2018.01); *F24F 2140/60* (2018.01); *G05B 2219/2614* (2013.01); *G05B 2219/2639* (2013.01); *G06F 30/13* (2020.01); *G06F 30/20* (2020.01); *G06F 2119/08* (2020.01); *Y02P 90/82* (2015.11)

(58) Field of Classification Search
CPC .............. F24D 19/1081; F24D 19/1048; F24F 2140/60; G06F 2217/82; G05B 2219/2614; Y02P 90/82
See application file for complete search history.

(56) References Cited

U.S. PATENT DOCUMENTS

| | | | | |
|---|---|---|---|---|
| 7,451,017 | B2 * | 11/2008 | McNally | G06Q 50/06 700/291 |
| 2013/0238144 | A1 * | 9/2013 | Shahapurkar | G05D 23/1923 700/278 |
| 2014/0156085 | A1 * | 6/2014 | Modi | G05D 23/19 700/276 |

\* cited by examiner

*Primary Examiner* — Charles D Garber
*Assistant Examiner* — Alia Sabur

(57) ABSTRACT

The invention teaches a system and method for reducing energy consumption in commercial buildings. The invention provides development of certain mechanical heat profiles and use of such profiles in an automated optimization method. Outputs communicate with the building management system of the commercial building, and regulate the heating system during a season when the building activates the heating system. Various embodiments are taught.

2 Claims, 14 Drawing Sheets

Inventive Process Steps 100-150

Related U.S. Application Data continuation-in-part of application No. 14/606,989, filed on Jan. 27, 2015, now Pat. No. 9,317,026, which is a continuation-in-part of application No. 13/906,822, filed on May 31, 2013, now Pat. No. 8,977,405, which is a continuation of application No. 13/374,128, filed on Dec. 13, 2011, now abandoned.

(51) Int. Cl.
*G06Q 50/16* (2012.01)
*F24F 140/60* (2018.01)
*F24F 130/00* (2018.01)
*F24F 130/10* (2018.01)
*F24F 11/46* (2018.01)
*G06F 30/13* (2020.01)
*G06F 30/20* (2020.01)
*G06F 119/08* (2020.01)

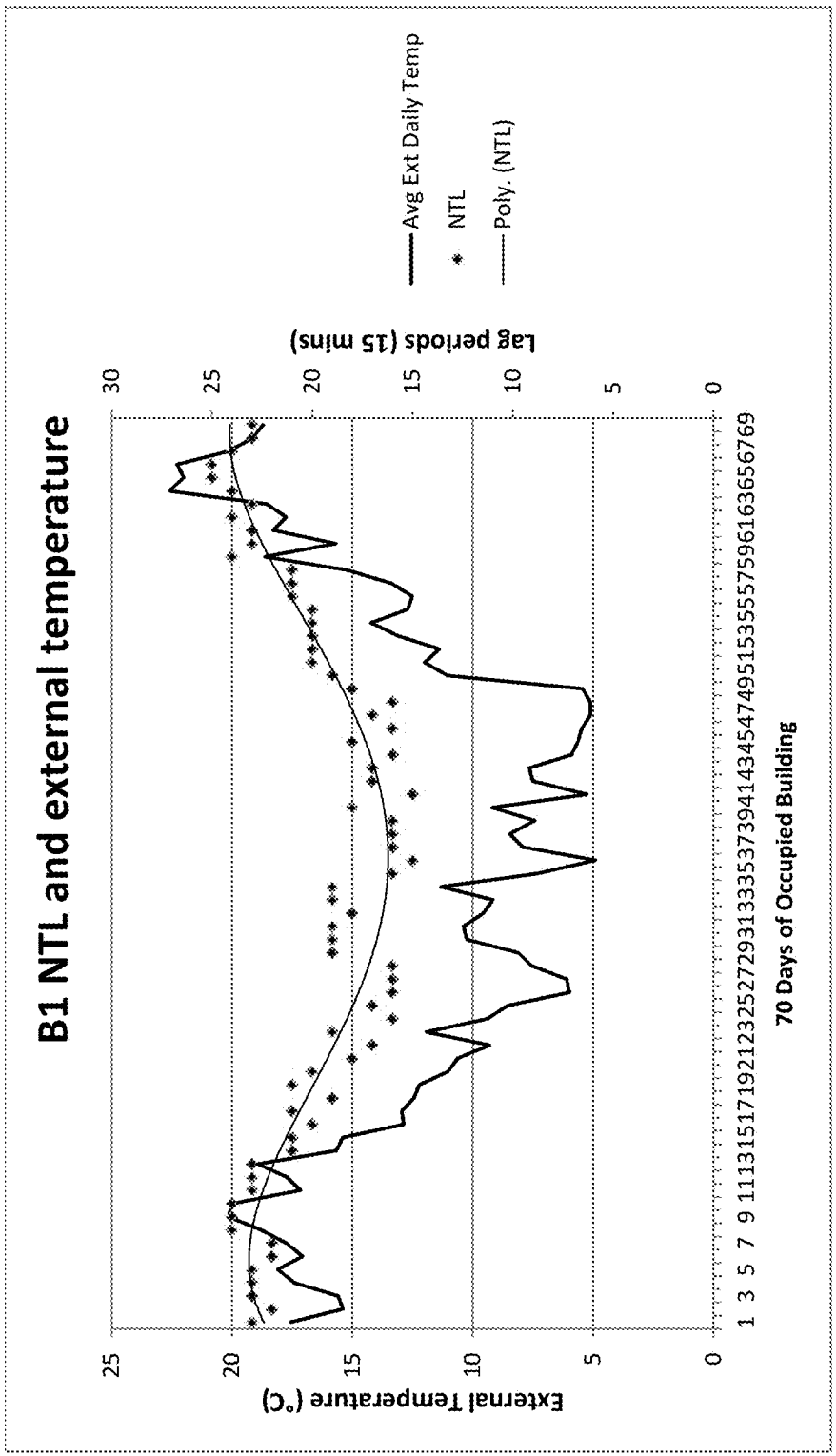
Figure 1 Plot of test building B1 natural thermal lag as a function of external temperature. External temperature is shown for reference

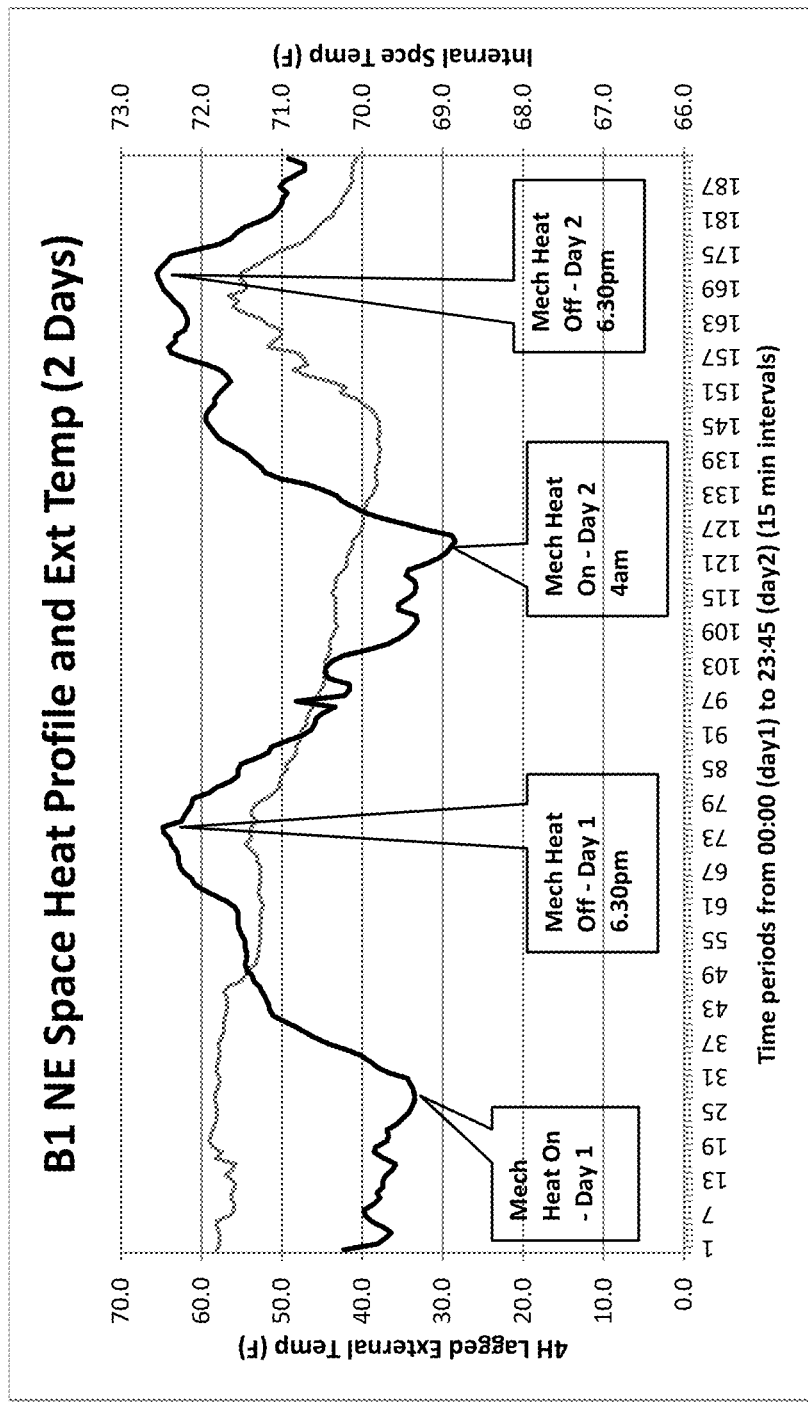
Figure 2 B1 mechanical heat-up lag profile as observed on Jan 9th/10th (black) and the 4 hour lagged external temperature (grey) on the same days. The times for mechanical heat on and off are also indicated. Following heat off, the natural cooling is shown for both days

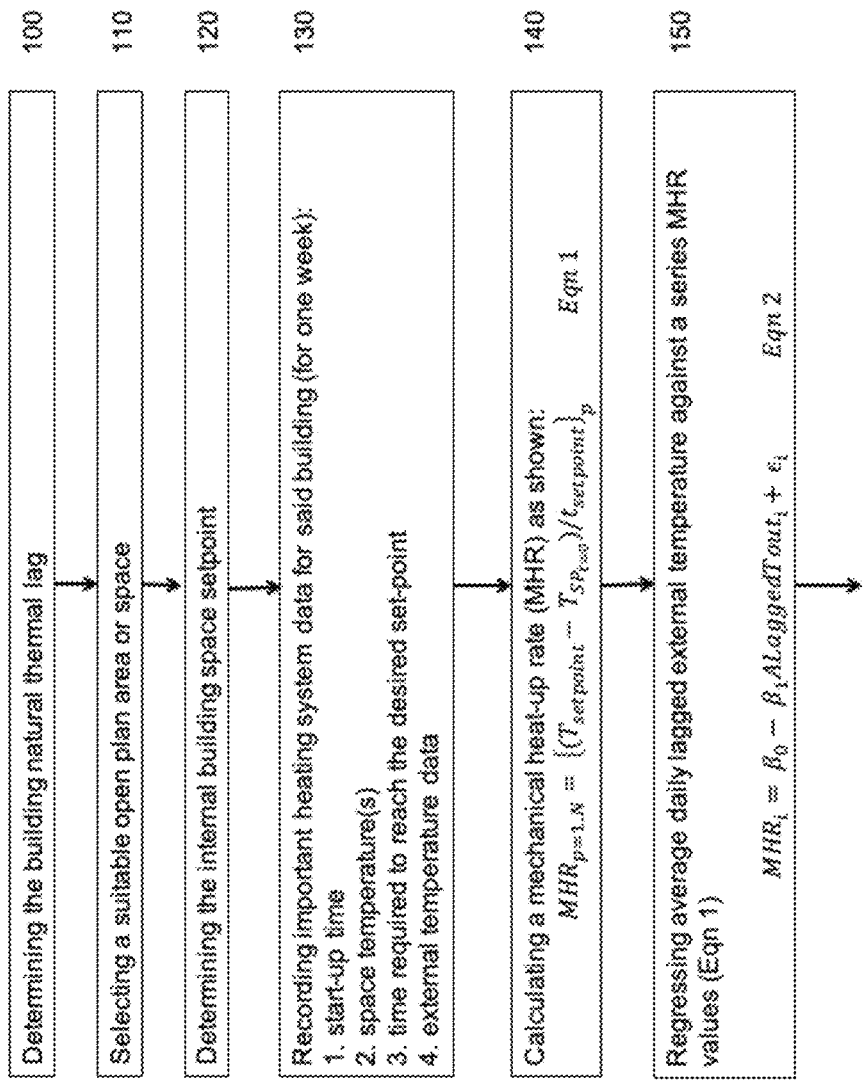
Figure 3a Inventive Process Steps 100-150

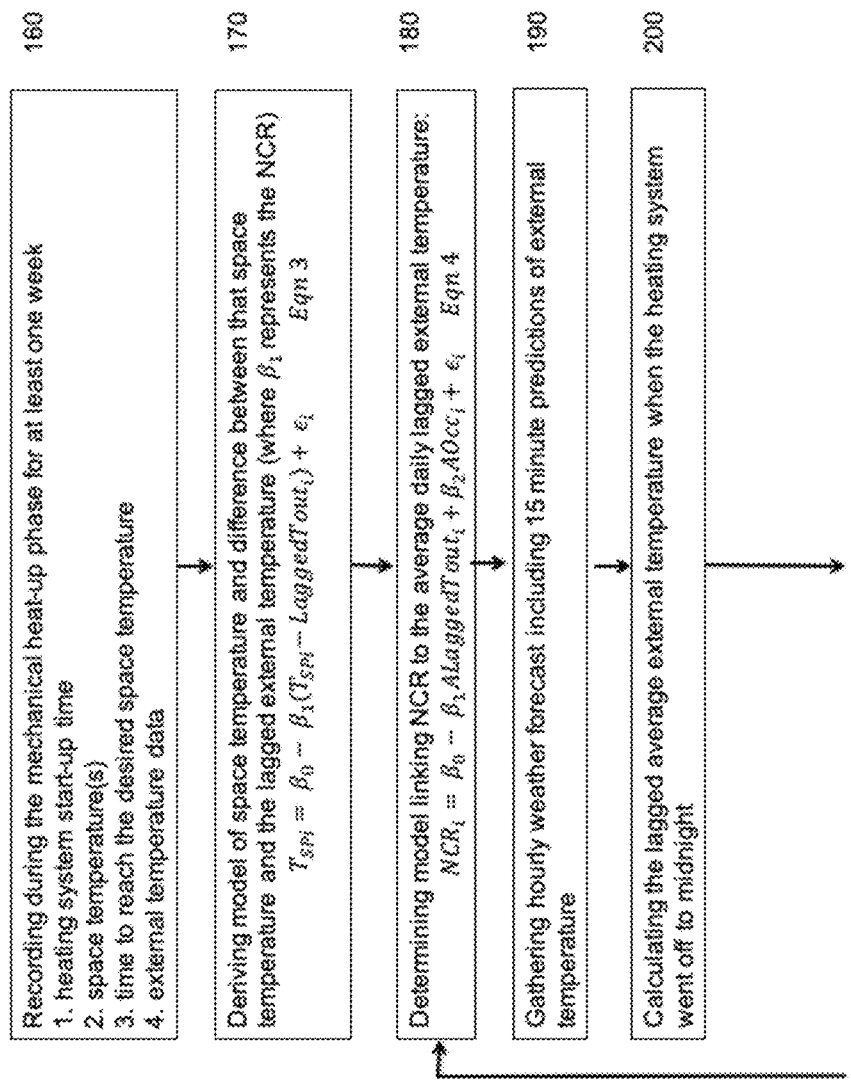
Figure 3b Inventive Process Steps 160-200

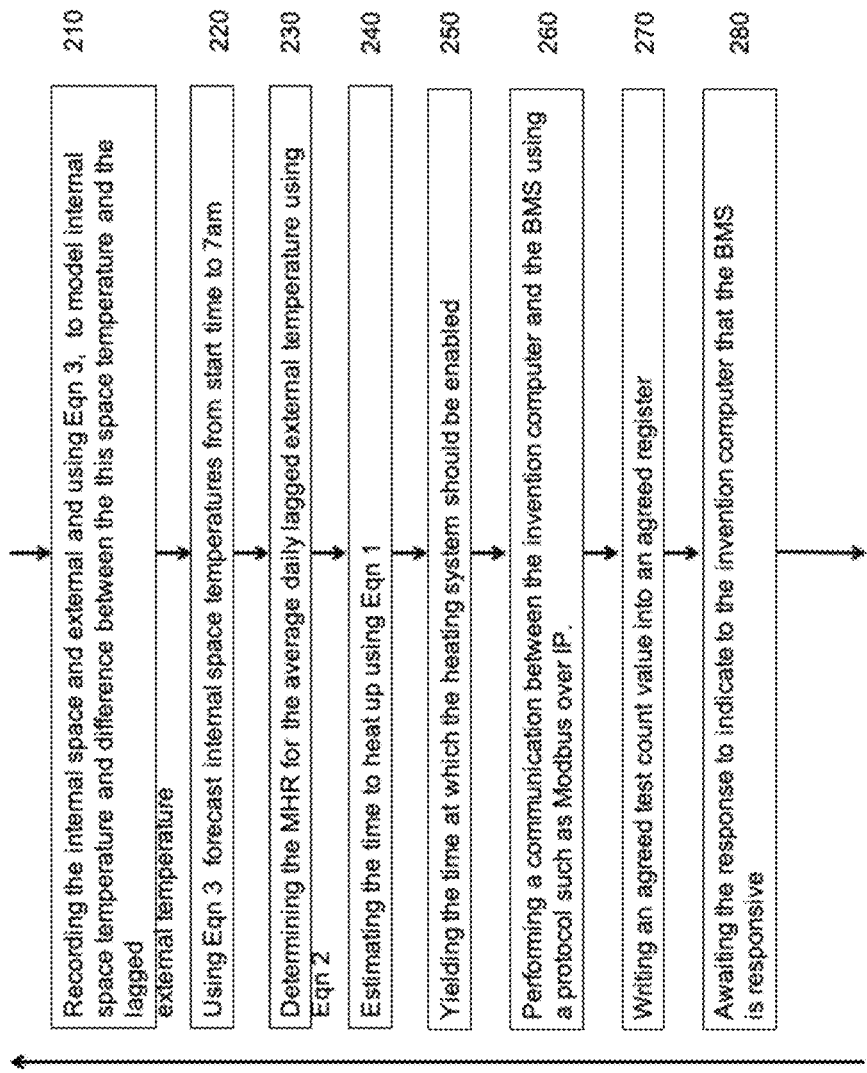
Figure 3c Inventive Process Steps 210-280

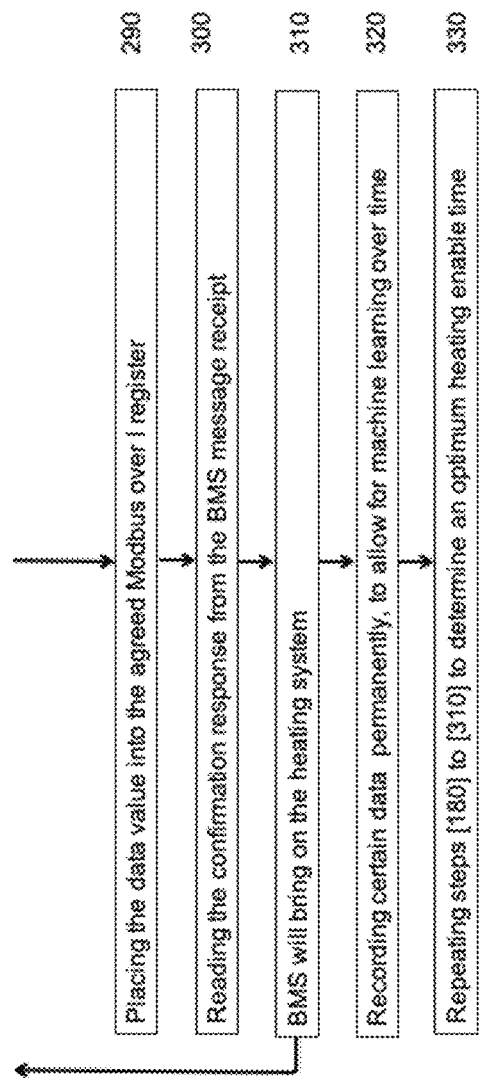
Figure 3d Inventive Process Steps 290-330

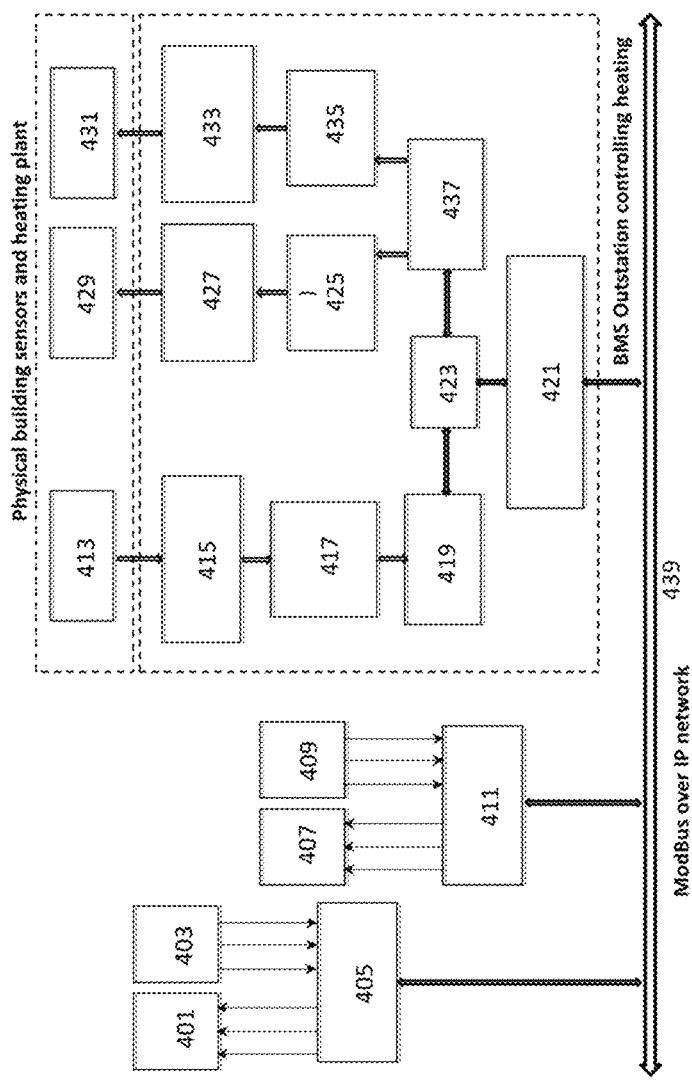
Figure 4a Physical connections from building management system to heating plant and Modbus over IP

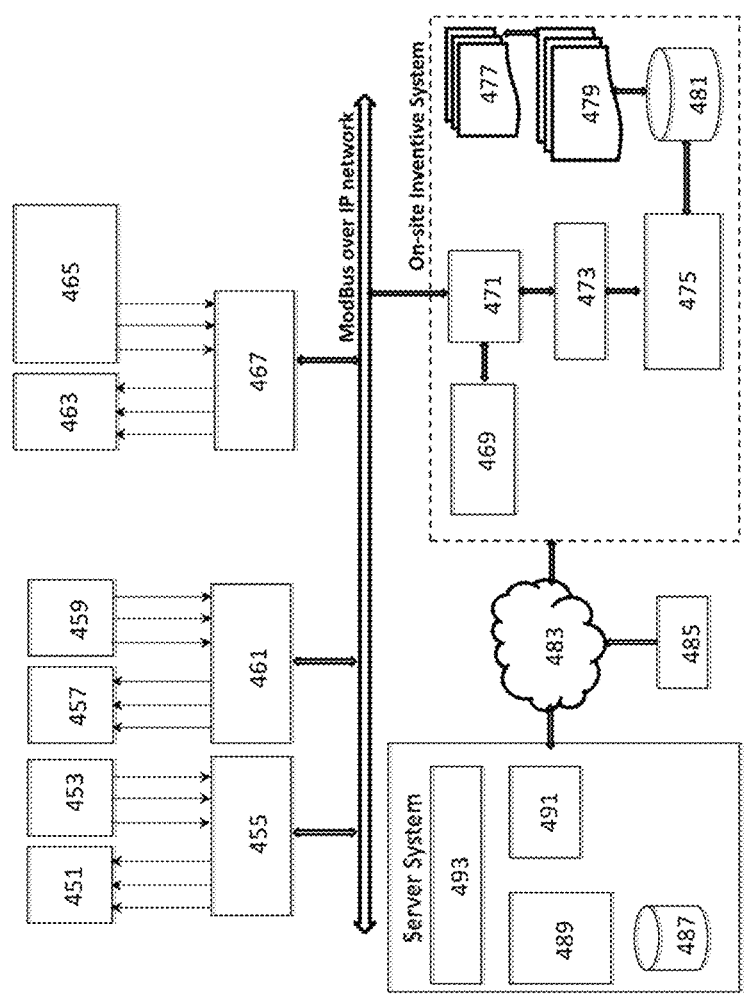
Figure 4b – Inventive system connecting to the BMS Modbus over IP network

| B1 Building Usage | Total electrical Power (kWh) | Total Natural Gas Usage (kWh) |
|---|---|---|
| Jan | 207,353 | 367,798 |
| Feb | 244,004 | 417,166 |
| Mar | 281,787 | 331,608 |
| Apr | 291,566 | 305,652 |
| May | 247,185 | 195,190 |
| Jun | 272,702 | 142,498 |
| Jul | 310,670 | 180,722 |
| Aug | 273,205 | 155,407 |
| Sep | 268,210 | 189,024 |
| Oct | 284,603 | 238,256 |
| Nov | 293,774 | 330,486 |
| Dec | 294,697 | 389,378 |
| Total | 3,269,756 | 3,243,185 |

Figure 5 B1 agreed energy baseline data from January to December in the benchmark year

| B1 kWhr/m²/yr | CIBSE typical | CIBSE Good Practice | B1 Baseline |
|---|---|---|---|
| Heat | 210 | 114 | 347 |
| Electricity | 358 | 234 | 350 |

Figure 6 B1 benchmark (BM) usage versus CIBSE usage ranges for heat and electricity

| B1 Building Thermal Parameter | Model | Dependant Variable | Units |
|---|---|---|---|
| Natural thermal lag profile (NTL) | $NTL = 12.93 - 0.555 Tout \pm 1.85$ | External Temp | 15 min periods |
| Mechanical heating Rate (MHR) | $MHR = -15.4 - 17.73 ALaggedTout \pm 3.1$ | NTL | °F/hour |
| Natural Cooling Rate (NCR) | $NCR = 45.1 - 4.43 ALaggedTout + 0.11 AOcc \pm 2.16$ | NTL | °F/hour |

Figure 7 B1 thermal profile statistical models derived from on-site and observed data

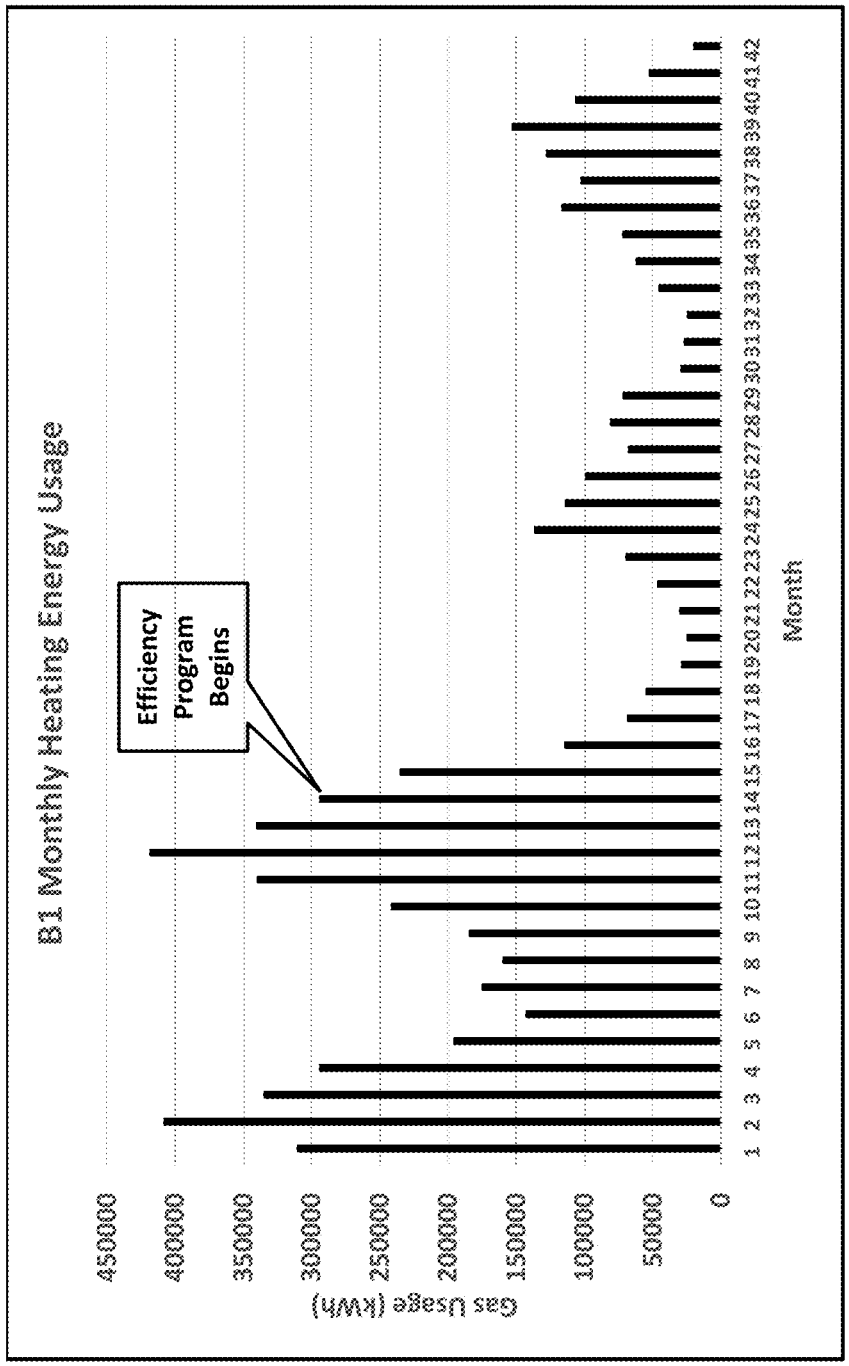
Figure 8 Total heating delivered to B1 over a 42 month period with the commencement of the energy efficiency program indicated after the first 12 month period

| Building B1 kWh/m²/yr | CIBSE typical | CIBSE Good Practice | 2010 (benchmark year) | 2011 | 2012 | 2013 |
|---|---|---|---|---|---|---|
| Heat | 210 | 114 | 347 | 159 | 88 | 109 |
| Electricity | 358 | 234 | 350 | 301 | 241 | 211 |

Figure 9 Annual heating and electrical energy use outcomes for B1 over the four period

| Building B1 | Pre-Efficiency Program | Post-Efficiency Program |
|---|---|---|
| Month | Total Electricity Usage (BM) | Total Electricity Usage |
| Jan | 207,353 | 176,047 |
| Feb | 244,004 | 162,647 |
| Mar | 281,787 | 162,764 |
| Apr | 291,566 | 163,730 |
| May | 247,185 | 164,220 |
| Jun | 272,702 | 150,155 |
| Jul | 310,670 | 177,270 |
| Aug | 273,205 | 162,086 |
| Sep | 268,210 | 160,435 |
| Oct | 284,603 | 170,557 |
| Nov | 293,774 | 168,027 |
| Dec | 294,697 | 160,111 |
| TOTAL | 3,269,756 | 1,978,048 |

Figure 10 Comparison of B1 total electrical usage over a calendar year prior to and after the implementation of the energy efficiency program. All of the reduction in electrical usage is attributable to the cooling system, since no other measures were implemented.

DEVELOPMENT OF CERTAIN BUILDING DATA PROFILES AND THEIR USE IN AN AUTOMATED OPTIMIZATION METHOD TO REDUCE THERMAL ENERGY CONSUMPTION IN COMMERCIAL BUILDINGS DURING THE HEATING SEASON

RELATED APPLICATIONS

This application is a continuation in part of U.S. application Ser. No. 15/066,681 SH007 by the same inventor, entitled Development of certain mechanical cooling profiles and their use in an automated optimization method to reduce energy consumption in commercial buildings during the cooling season filed Mar. 10, 2016, publication no. US 2016-0195865 A1 which is a continuation in part of U.S. application Ser. No. 14/606,989 SH003 by the same inventor, entitled Method for determining the unique natural thermal lag of a building, filed Jan. 27, 2015, publication no. US2015-0198961-A1, now U.S. Pat. No. 9,317,026, which is a continuation in part of application 13/906,822 SH002, filed May 13, 2013, now U.S. Pat. No. 8,977,405; and further related to U.S. application Ser. No. 14/607,011 SH005, filed Jan. 27, 2015, publication no. US2015-0198962-A1, now U.S. Pat. No. 9,395,712; the entireties of each of which are incorporated herein by reference as if fully set forth herein.

GOVERNMENT FUNDING

None

FIELD OF USE

The invention is useful in energy management, and more particularly in the field of energy management in commercial buildings.

BACKGROUND

Energy use analysis in commercial buildings has been performed for many years by a number of software simulation tools which seek to predict the comfort levels of buildings while estimating the energy use. The underlying principles of these tools concentrate on thermal properties of individual elements of the building itself, such as wall panels, windows, etc. The complexity and level of detail required to accurately simulate a commercial building often makes its use prohibitive. The accuracy of such models has also been called into question in the research material. Following the construction and occupation of a new commercial building, the installed plant, such as boilers and air conditioning equipment, whose function is to provide suitable occupant comfort, is usually controlled by a building management system (BMS).

Through practical experience within the construction industry, it has become known that this plant is often over-sized and the use of the plant is often excessive. Common examples of this include plant operating for significantly longer than required including unoccupied weekends, heating and cooling simultaneously operating in the same areas due to construction or control strategy problems and issues with overheating and the use of cooling to compensate. Where the common problem of overheating occurs, the building envelope is quite efficient in dumping excess heat by radiation. In a similar manner, where buildings are over-cooled in summer, buildings are very effective in absorbing heat from the external environment to compensate. The utilization of this plant is not normally matched to the building envelope in which it operates and it is the intention to show how the method can help with this matching process.

The teachings in U.S. Pat. No. 8,977,405 and publication no. US2015-0198961-A1, provide a series of methods developed to provide a high-level view of thermal performance in a commercial building. This view is quick to implement and easily understood by facilities and maintenance staff. The methods facilitate a better understanding of the thermal performance of a building envelope, as constructed, and the interaction between this envelope and the building's heating and cooling plant, as installed. The thermal performance of the building envelope and how it interacts with the plant has been expressed as a series of time lags and profiles which are functions of external temperature and solar activity. External temperature remains the most influential of the external weather parameters on energy usage. The lags and profiles have been developed to be derived from data which is readily available within modern conventional buildings.

BRIEF SUMMARY OF THE INVENTION

Following the teaching in U.S. Pat. No. 8,977,405, where the derivation of a building's natural thermal lag and the solar gain lag were presented, and publication no. US2015-0198961-A1 where a less data intensive method to calculate the natural thermal lag was presented, the following is an explanation of how the natural thermal lag can be used to derive a series of thermal profiles which can be combined to achieve automated optimization of thermal energy usage in commercial buildings during the heating season. While the absolute values of these lags, as they vary with external temperature, are important building thermal parameters in their own right, the profile of the relationship between these lag values and external temperature, as it varies over the full year's weather seasons, is more revealing about the building's thermal characteristics. In certain climates, the inclusion of solar activity in the lag relationship is required. This is for the simple reason that, depending on the building envelope, high solar activity during winter can affect the amount of heating required in a building, particularly in warm climates.

Two thermal heating parameters have been defined and are derived from data while the building is being mechanically heated, assumed to be during the working day. These thermal parameters are unique to each commercial building. The parameters are: mechanical heating rate (MHR) and natural cooling rate (NCR).

The mechanical heating rate is a measure of how quickly the average space temperature in a suitable number of open spaces in a building reaches the desired heating set-point as measured from the space temperature at the time the heating system was started. This is measured in ° F./min and the mechanical heat-up rate will vary depending on the internal temperature observed when the heating systems switched on. The MHR is a measure of the slope of the internal space temperature profile as it rises due to mechanical heating.

The natural cooling rate (NCR) is a measure of how quickly the average space temperature in a suitable number of open spaces in a building naturally falls after mechanical heating has been switched off, during the heating season. It is the rate at which this cooldown happens naturally and has been shown to depend on the average daily lagged external temperature. The slope is measured from the time the mechanical heating stops to the time the mechanical heating starts up again (usually the following morning).

Both of the thermal cooling parameters are dependent on the average daily lagged external temperature where the amount of lag applied has been determined by the building's natural thermal lag.

The two thermal parameters MHR and NCR, which are unique to any commercial building, can be used in combination with the weather forecast, particularly the forecast of external temperatures, to estimate the likely internal space temperature which will be present at the time the heating system will commence operation. The amount of time required to bring the internal space temperature to the desired set-point can also be estimated and with this information, it is possible to determine an optimum starting time for the heating system as a function of average daily lagged external temperature, for a particular commercial building.

This invention provides a method to reduce the thermal energy used in a commercial building by use of thermal parameters which are derived from readily-available data both internal and external to the building. The inventive method can be incorporated directly into a Building's Control System or alternatively, outputs from the inventive system may communicate with the building management system of the commercial building, and therefore improves the performance of the Building's Control System by improved regulation of the heating system during a season when heating is required. As described in this specification, the inventive system was implemented as a module of a Trend™ BMS (UK) Version 963 and separately as part of a Cylon™ BMS (Ireland) Version 2.1. Both systems used Modbus over IP as a communications protocol.

BRIEF DESCRIPTION OF THE DRAWINGS

The drawings listed are provided as an aid to understanding the invention.

FIG. 1 Plot of test building B1 natural thermal lag as a function of external temperature. External temperature is shown for reference FIG. 2 B1 mechanical heat-up lag profile as observed on January $9^{th}/10^{th}$ (black) and the 4 hour lagged external temperature (grey) on the same days. The times for mechanical heat on and off are also indicated. Following heat off, the natural cooling is shown for both days FIG. 3a Inventive Process Steps 100-150

FIG. 3b Inventive Process Steps 160-200

FIG. 3c Inventive Process Steps 210-280

FIG. 3d Inventive Process Steps 290-330

FIG. 4a Physical connections from building management system to heating plant and Modbus over IP FIG. 4b-Inventive system connecting to the BMS Modbus over IP network FIG. 5 B1 agreed energy baseline data from January to December in the benchmark year FIG. 6 B1 benchmark (BM) usage versus CIBSE usage ranges for heat and electricity FIG. 7 B1 thermal profile statistical models derived from on-site and observed data FIG. 8 Total heating delivered to B1 over a 42 month period with the commencement of the energy efficiency program indicated after the first 12 month period FIG. 9 Annual heating and electrical energy use outcomes for B1 over the four year period FIG. 10 Comparison of B1 total electrical usage over a calendar year prior to and after the implementation of the energy efficiency program. All of the reduction in electrical usage is attributable to the cooling system, since no other measures were implemented.

DETAILED DESCRIPTION OF A PREFERRED EMBODIMENT OF THE INVENTION

Introduction

The invention provides a computer implementable method and system capable of connecting directly to and controlling a commercial building management system, and more specifically to turn heating systems on and off. The purpose of the invention computer system is to provide improved control of plant operations to enable significant energy savings in commercial buildings while providing desirable occupant comfort levels.

This section describes the introduction of new thermal heating profiles, the manner in which these profiles along with the natural thermal lag described in U.S. Pat. No. 8,977,405 and publication no. US2015-0198961-A1 can be applied to the control of plant in a particular building, and finally, the application of these concepts to an actual building and the energy reduction results.

Following the teaching in U.S. Pat. No. 8,977,405, where the derivation of a building's natural thermal lag was presented and in publication no. US2015-0198961-A1 where a less data intensive method to calculate the natural thermal lag was presented, the following is an explanation of how the natural thermal lag, along with a number of important thermal profiles, can be combined to achieve automated optimization of energy usage in commercial buildings. The following sections recap on how the natural thermal lag is derived and also shows the derivations of the mechanical heating rate and the natural cooling rate. Both of these thermal parameters have been shown to be closely correlated to the average daily lagged external temperature where the amount of lag used in calculating the average daily lagged external temperature is determined by the building's unique natural thermal lag.

Natural Thermal Lag

The derivation of the building-unique natural thermal lag can be summarized as follows:

The natural thermal lag (NTL) of a commercial building is a unique property which indicates how quickly the internal spaces of the building respond to changes in external temperature. The NTL can be derived as follows:

a) using previously recorded data within said commercial building being 12 months of internal and external temperature data recorded at 15-minute intervals while the building was at rest, or in other words, the building was not in use, had no plant operating and experienced less than 1 hour of solar activity during the day in question (see U.S. application Ser. No. 13/906,822). If internal temperature data is not available, the data used are energy consumption and external temperature data recorded at 15-minute intervals (see U.S. application Ser. No. 14/606,989)

b) deriving the natural thermal lag (NTL) of said commercial building by applying the sum of squares method (outlined in U.S. application Ser. No. 13/906,822) on the 12 months of internal and external temperature data only on days when the building was at rest, where each value of NTL is calculated according to:

$$LagIndex_{LW} = \sum_{i=2p}^{p} (T_{S_i} - T_{O_{i-LW}})^2$$

wherein $LagIndex_{LW}$ is a sum of squares particular to a range of external temperatures indicated by a value LW, p is a number of 15 minute observations examined, $T_{S_i}$ is an internal space temperature at time period i, $T_{O_{i-LW}}$ is an outside temperature at LW periods prior to time period i If internal temperature is not available, apply the building energy to external temperature data regression analysis method as follows:

$$E_i = \beta_0 + \beta_1(LT_i)_{k=0 \ldots 8} + \epsilon_i$$

where $E_i$ represents average hourly energy usage for said building on day i, $\beta_0$ represents a Y axis intercept of a linear relationship between energy and lagged temperature average, $\beta_1$ represents a slope of a relationship between average hourly energy usage and a lagged temperature average $(LT_i)_{k=0 \ldots 8}$ for a day i and ranging over a period k from 0 to 8 hours prior to a building closing time, $\epsilon$ is estimated variation.

The particular index of lagged average external temperature during the winter yields the low point of NTL sinusoid, while the particular index of lagged average external temperature during the summer yields the high point of the NTL sinusoid. This yields an approximated NTL plot over the full year (see U.S. application Ser. No. 14/606,989).

c) Each NTL point (one for each day the building is at rest) can be plotted against the average external temperature recorded for that day. The relationship between the NTL and average daily external temperature can be established according to the regression equation:

$$NTL_i = \beta_0 - \beta_1 Tout_i + \epsilon_i$$

wherein $NTL_i$ is the natural thermal lag calculated on a particular day i $\beta_0$ is the intercept of the linear relationship between NTL and the average daily external temperature Tout on the y-axis $\beta_1$ is the slope of the linear relationship between NTL and the average daily external temperature Tout $Tout_i$ is the average daily external temperature calculated as the average of the 96 external temperature readings recorded during day i $\epsilon_i$ is the variability in the linear relationship.

Once the particular relationship between NTL and daily average external temperature is established for said commercial building, the NTL can be estimated for any given average daily external temperature.

Natural Thermal Lag Profile

Plotting the individual values of the natural thermal lag derived from data for each day the building is at-rest is indicated in FIG. 1. From FIG. 1, it is evident that the NTL is strongly related to the average daily external temperature. The strength of that relationship for this building can be examined by linear regression in which daily average outside temperature $Tout_i$ can be regressed against the observed NTL (based on results in Ser. No. 13/906,822).

This relationship can be statistically modelled as a simple linear regression of:

$$NTL_i = \beta_0 - \beta_1 Tout_i + \epsilon_i$$

The actual model derived for the test building B1 is:

$$NTL = 12.93 - 0.555 Tout \pm 1.9$$

The parametric statistics which define this relationship are shown as an extract from the Minitab statistical analysis package:

Regression Analysis: B1 NTL versus Average Tout

| The regression equation is NTL = 12.93 + 0.5546 Average Tout | | | | |
|---|---|---|---|---|
| S = 0.851145 | R-Sq = 91.7% | | R-Sq(adj) = 91.6% | |
| Analysis of Variance | | | | |
| Source | DF | SS | MS | F | P |
| Regression | 1 | 539.462 | 539.462 | 744.65 | 0.000 |
| Error | 67 | 48.538 | 0.724 | | |
| Total | 68 | 588.000 | | | |

This particular NTL response curve in FIG. 1 is defined by the high and low points. The curve remains consistently sinusoidal in following the pattern of average external temperatures from year to year. Therefore, it follows that if the high and low points are known, the annual NTL response curve can be estimated.

In publication no. US2015-0198961-A1, it has been shown how energy usage data of winter heating and summer cooling can be used to determine the optimum value of NTL for these seasons without any reference to internal temperature data.

In fact, these values of NTL for summer and winter represent the highest and lowest points of the sinusoid and therefore a method to determine the year-long NTL response for this building has been developed, based on energy usage and external temperature data alone.

This facilitates the simple estimation of the building's unique NTL to be used for energy efficiency purposes, in the event that rapid estimation is required or that a full year of internal space temperature data is unavailable.

The mechanical space cool-down rate and the day-time heat-up rate are now defined. They are useful in determining the best start times for cooling plant based on the external temperature profile contained in a weather forecast. This section shows how these two thermal parameters can be applied to plant start times and are therefore used to reduce energy consumption in commercial buildings.

Mechanical Heating Rate

The mechanical heating rate (MHR) is a measure of how quickly the average space temperature in a suitable number of open spaces in a building reaches the desired heating set-point as measured from the space temperature at the time the heating system was started. See FIG. 2. For any given building, on any given day, if the space temperature is already above the set-point during the start-up phase, then heating may not be required. On these days, this analysis does not apply as heating or no action may be required.

The MHR will vary depending on the internal temperature observed when the heating systems switched on. The MHR is defined as the rate of increase of space temperature from that observed at heating system on time to the time at which the set-point is reached and can be described as:

$$MHR_{p=1\ldots N} = \{(T_{setpoint} - T_{SP_{t=0}})/t_{setpoint}\}_p \quad 5$$

where $T_{setpoint}$ is the internal space temperature setpoint (usually 72° F.)

$T_{SP_{t=0}}$ is the internal space temperature observed when the heating was started $t_{setpoint}$ is the time required to heat the space from the starting temperature $T_{SP_{t=0}}$ to the required setpoint $T_{setpoint}$ Each value of MHR is calculated for each day the heating system operates. Recording the average daily lagged external temperature for each of these days yields a series of $MHR_{p=1\ldots N}$ values for heating days 1 ... N which can be plotted to show how the MHR varies with average daily lagged external temperature. It has been shown in practical use of this method that a linear regression relationship can be formed to show how the mechanical heat-up rate varies with average daily lagged external temperature. The amount of lag applied to determine the average daily lagged external temperature for this building is guided by the building's already determined natural thermal lag.

This relationship can be defined in general form as follows:

$$MHR_i = \beta_0 - \beta_1 ALaggedTout_i + \epsilon_i$$

wherein $MHR_i$ is the calculated mechanical heat-up rate on any given day i, on which the heating system is operating $\beta_0$ represents the intercept of the linear relationship between mechanical heating rate and lagged external temperature, as guided by the NTL, on the y-axis $\beta_1$ represents the slope of the relationship between $MHR_i$ and lagged average external temperature $ALaggedTout_i$ $ALaggedTout_i$ represents the value of average lagged external temperature, guided by NTL, and calculated for any given day i $\epsilon$ represents variability.

Natural Cooling Rate (NCR)

The natural cooling rate (NCR) is a measure of how quickly the average space temperature in a suitable number of open spaces in a building naturally falls after mechanical heating has been switched off. It is the rate at which this cooldown happens naturally and has been shown to depend on the average daily lagged external temperature and the average occupancy in those spaces over the cooling period. The slope is measured from the time the mechanical heating stops to the time the mechanical heating starts up again (usually the following morning).

The NCR is derived by first finding the relationship between the space temperature and the difference between this space temperature and the lagged external temperature over the period while the mechanical heating is switched off.

A regression model is derived to show how the internal space temperature changes as a function of the difference between that space temperature and the lagged external temperature for each heating day along with the average occupancy by using an equation:

$$T_{SPi} = \beta_0 - \beta_1(T_{SPi} - LaggedTout_i) + \epsilon_i$$

wherein $T_{SPi}$ is the internal space temperature recorded at time period i $\beta_0$ represents the intercept of the linear relationship between the internal space temperature and the difference between the internal space temperature and the external lagged temperature, as guided by the NTL, on the y-axis $\beta_1$ represents the slope of the relationship between the internal space temperature $T_{SPi}$ and the difference between that temperature and the external lagged temperature $LaggedTout_1$ at time period i $LaggedTout_1$ is the value of lagged external temperature, as guided by the natural thermal lag, observed for any given time period i $\epsilon$ represents variability The slope of this linear relationship $\beta_1$ is the NCR for this particular cooling period. By deriving several values of NCR, one for each day, recording the average occupancy in any given space, and recording the average daily lagged external temperature during the same periods, a predictive relationship can be formed which indicates how the NCR will vary as a function of daily average lagged external temperature and occupancy. If occupancy remains approximately constant each day, as in an office building, this predictive variable may have no influence on the NCR to lagged external temperature relationship. This yields a series of $NCR_{p=1\ldots N}$ values for heating days 1 ... N. This is shown in generalized form as follows:

$$NCR_i = \beta_0 - \beta_1 ALaggedTout_i + \beta_2 AOcc_i + \epsilon_i$$

wherein $NCR_i$ is the derived natural cooling rate slope on any given day i, on which the heating system is operating $\beta_0$ represents the intercept of the linear relationship between NCR and daily average lagged external temperature as guided by the natural thermal lag on the y-axis $\beta_1$ represents the slope of the relationship between $NCR_i$ and daily lagged average external temperature $ALaggedTout_i$ $\beta_2$ represents the slope of the relationship between $NCR_i$ and daily average occupancy $AOcc_i$ $ALaggedTout_i$ represents the value of daily average lagged external temperature guided by the natural thermal lag calculated for any given day i $\epsilon_i$ represents the variability in the linear model for that particular day's model Method steps are outlined in FIG. 3, 3a though 3g inclusive, are explained in the following section. Arabic numerals indicating method steps are placed at the beginning of the line for ease of reference to the figures.

Method 1—Determination of weather and building dependent starting time for cooling system, comprising steps:

a) 100 Determining the building natural thermal lag by the means shown—these have shown in the preceding sections. Two methods exist and which one is used is determined by the data available. The methods to derive the natural thermal lag are more fully explained in U.S. published application Ser. Nos. 13/906,822 and 14/606,989;

b) 110 Selecting a suitable open plan area or space within said commercial building or a series of suitable open spaces in which to observe the space temperature(s);

c) 120 Determining the internal building space setpoint for the current cooling season. This is usually set at approximately 72° F. This is simply read off the building management system computer screen;

d) 130 Recording the following data from the building management system computer screens and physically verified during the mechanical heat-up phase (usually in the morning) for said building:
1. heating system start-up time
2. space temperature(s) for the chosen open plan location(s), at this start-up time
3. time required to reach the desired space temperature set-point (typically 72° F.)
4. external temperature data in 15 minute intervals
5. Record this data for a period of one week, or longer if building operations allow e) 140 Calculating, using the recorded data, a mechanical heat-up rate (MHR) for each working day (i.e. a day building is occupied) using an equation:

$$MHR_{p=1\ldots N} = \{(T_{setpoint} - T_{SP_{t=0}})/t_{setpoint}\}_p \quad \text{Eqn 1}$$

where $T_{setpoint}$ is the internal space temperature setpoint (usually 72° F.)

$T_{SP_{t=0}}$ is the internal space temperature observed when the heating was started $t_{setpoint}$ is the time required to heat the space from the starting temperature $T_{SP_{t=0}}$ to the required setpoint $T_{setpoint}$ f) 150 Recording each average daily lagged external temperature for the day the MHR was calculated, where said lag is guided by the building's natural thermal lag. This yields a series of $MHR_{p=1\ldots N}$ values for heating days 1 ... N. A regression relationship can be established which links the MHR to the average daily lagged external temperature and this is shown in generalized form in Eqn 2:

$$MHR_i = \beta_0 - \beta_1 ALaggedTout_i + \epsilon_i \quad \text{Eqn 2}$$

wherein $MHR_i$ is the calculated mechanical heat-up rate on any given day i, on which the heating system is operating $\beta_0$ represents the intercept of the linear relationship between mechanical heating rate and lagged external temperature, as guided by the NTL, on the y-axis $\beta_1$ represents the slope of the relationship between $MHR_i$ and lagged average external temperature $ALaggedTout_i$ $ALaggedTout_i$ represents the value of average lagged external temperature, guided by NTL, and calculated for any given day i $\epsilon$ represents the variability in the linear model Once the particular lagged external temperature is known, it is possible to forecast the approximate value of the MHR which will pertain to a commercial building based on a short-term weather forecast.

g) 160 Recording the following data from the building management system computer screens and physically verified during the natural cooling phase in the evening for said building by recording:
1. heating plant shut-down time
2. space temperature(s) for the chosen open plan location(s) at this shut-down time (usually 72° F.)
3. Space temperature(s) for the chosen open plan location(s) at the time when heating starts the following morning
4. external temperature data in 15 minute intervals
5. Record this data for a period of one week, or longer if building operations allow;

h) 170 Deriving, using this recorded data, a regression model to show how the internal space temperature changes as a function of the difference between that space temperature and the lagged external temperature for each heating day using an equation:

$$T_{SPi} = \beta_0 - \beta_1(T_{SPi} - LaggedTout_i) + \epsilon_i \quad \text{Eqn 3}$$

wherein $T_{SPi}$ is the internal space temperature recorded at time period i $\beta_0$ represents the intercept of the linear relationship between the internal space temperature and the difference between the internal space temperature and the external lagged temperature, as guided by the NTL, on the y-axis $\beta_1$ represents the slope of the relationship between the internal space temperature $T_{SPi}$ and the difference between that temperature and the external lagged temperature $LaggedTout$ at time period i $LaggedTout_i$ is the value of lagged external temperature, as guided by the NTL, observed for any given time period i $\epsilon_1$ represents the variability in the linear model for that particular day i) 180 Determining the natural cooling rate (NCR) on days the heating system is operating, to help estimate the starting point for the internal space temperature at heating start time for each day on which the heating is operating, repeat the process outlined in g), recording each average daily lagged external temperature and the slope of the regression relationship pertaining to that particular day, $\beta_1$ or NCR. In this regression model (Eqn 3), the slope $\beta_1$ will be referred to as the NCR. This yields a series of $NCR_{p=1\ldots N}$ values for cooling days 1 ... N. A relationship can be established which links the NCR to the average daily average lagged external temperature and this is shown in generalized form in Eqn 4:

$$NCR_i = \beta_0 - \beta_1 ALaggedTout_i + \beta_2 AOcc_i + \epsilon_i$$

wherein $NCR_i$ is the derived natural cooling rate slope on any given day i, on which the heating system is operating $\beta_0$ represents the intercept of the linear relationship between NCR and daily average lagged external temperature as guided by the natural thermal lag on the y-axis $\beta_1$ represents the slope of the relationship between $NCR_i$ and daily lagged average external temperature $ALaggedTout_i$ $\beta_2$ represents the slope of the relationship between $NCR_i$ and daily average occupancy $AOcc_i$ $ALaggedTout_i$ represents the value of daily average lagged external temperature guided by the natural thermal lag calculated for any given day i $\epsilon_i$ represents the variability in the linear model for that particular day's model j) 190 Gathering the hourly weather forecast to include 15 minute predictions of external temperature for the following 8-12 hours, ensuring the forecast extends beyond the estimated winter natural thermal lag of the commercial building in question;

k) 200 Calculating typically at or about midnight, the lagged average external temperature over a data window starting when the heating system went off, using recorded 15-minute temperature data from that time to approximately midnight;

l) 210 Recording the internal space and external temperatures from heating off time to midnight or so, and using the general model shown in Eqn 3, generate a model describing the relationship, during this heating off time (usually at night), between the recorded internal space temperature and difference between the this space temperature and the lagged external temperature;

m) 220 Using this model (Eqn 3), and the predicted lagged external temperatures in the weather forecast, forecast the likely internal space temperatures at each 15-minute period until occupancy start time, say, 7 am;

n) 230 Determining the MHR for the average daily lagged external temperature using recorded external temperatures in conjunction with those from the weather forecast using Eqn 2;

o) 240 Estimating the time to heat up, by knowing the likely MHR for this particular day, the heating set point and the internal temperature predicted in step 1), and using Eqn 1;

p) 250 Subtracting this estimate of heat up time from the agreed occupancy start time, yields the time at which the heating system should be enabled;

q) 260 Performing a communication between the invention computer and the BMS using a protocol such as Modbus over IP. This communication will usually happen at the heating system on time. For example if the hex value of 0x1010 represents 'Heating system ENABLE' if placed in Modbus register 8006, as agreed with the BMS programmer;

r) 270 Writing an agreed test count value into an agreed register to ensure the BMS knows the invention computer is present and functional;

s) 280 Awaiting the response from the BMS, to indicate to the invention computer that the BMS is responsive t) 290 Placing the 0x1010 data value into the agreed Modbus over IP protocol register at the appropriate heating on time;

u) 300 Reading the confirmation response from the BMS in another register to confirm to the invention computer that the instruction to enable the heating system has been received;

v) 310 Responding to this writing of digital data (0x1010) into this register (8006), the BMS will bring on the heating system;

w) 320 Recording permanently, the observed 15-minute interval data for weather forecast, internal space temperatures and all other relevant data used in the above equations to facilitate more accuracy in the data regression models, to effectively allow for machine learning over time;

x) 330 Repeating steps d) 130 to v) 310 at an appropriate time (usually at the start of each day) to determine an optimum cooling enable time during the cooling season.

Proof of Concept: Practical Use of the Method in Real Buildings

The method has been developed for practical implementation in real buildings. The majority of modern commercial buildings, be they office, retail, medical, educational, etc. are equipped with a building management system (BMS). The BMS is a computerized system which monitors vital parameters inside and outside the building and depending on the particular building-specific control strategy, the BMS will respond by switching plant on/off or if the plant has variable control, increasing/decreasing the level of output. Because of the need for high levels of reliability, availability and serviceability, most BMS are highly distributed in nature, meaning that one section of the BMS is completely independent of the others. This removes the risk of single points of failure in the overall system. The BMS hardware architecture therefore consists of control points (referred to as out-stations) which are autonomous but network connected. Each of these out-stations might monitor such things as several space temperatures and control multiple heating and cooling devices, in response to these monitored readings. The overall collection or framework of out-stations, monitors and controls go to make up the BMS. There are many manufacturers of these systems throughout the World; the largest might include companies such as Siemens (GR), Honeywell (US), Johnson Controls (US) or Trend (UK).

The most common form of communications within the BMS framework is a low level protocol called ModBus. This protocol was developed within the process control industry (chemical plants, oil refineries, etc.) and it dates from the earliest forms of computer control. The implementation concept of ModBus is that of addressable registers which are either readable, writable, or both. The easiest way to imagine the implementation is that of pigeon-holes. So with this protocol, it is possible to use a computer device, equipped with a ModBus hardware interface, to request the reading of a register (say register 8002) which might represent some space temperature (value can vary between 0000 and FFFF (in Hexadecimal) which, let's say, represents a temperature range of 0° F. to +200° F.). On reading this space temperature, the algorithm in the connected computer can now determine the response, so if the reading is 0x5EB8 (representing 74° F.), the computer might request that the heating valve be lowered and this is done by writing a new value to another register, say register 8006. The BMS will interpret this value and act accordingly. This assumes, of course, that the BMS is set up or programmed to monitor these registers and act accordingly. This protocol must be agreed with the BMS programmer in advance so that both sides of the ModBus registers are aware of the meaning and mapping of register addresses and values.

Physical Connections

In the practical implementation of this system, the physical connection to the BMS is normally achieved over an industry-standard Internet Protocol (IP) network. This is the same type of network installed in a standard office or commercial building. Much development has been done by the BMS manufacturers in recent years to get the BMS protocols, such as ModBus, to function over a standard Ethernet or IP network. This has led to ModBus over IP. If a new computer, such as the invention computer, is introduced to this Modbus over IP network, the new computer is simply assigned an IP address by the network administrator and thereafter, that computer can issue read and write commands over IP, once the map of registers is known to the new computer. As mentioned, this map is known to the BMS programmer, so the introduction of the new computer would preferably happen with the knowledge and agreement of the BMS programmer. The BMS programmer may assign certain rights and privileges to the new computer thus dictating what it can read and what it can control by register writes.

The following blocks are contained in FIG. 4a:

401 Control Outputs to chiller—typically 2 or 3 wire Run Enable shielded cables to the boiler controls

403 Status inputs from chiller—typically 2 or 3 wire for digital inputs and 0-10 v (or 3-20 mA) signals from the chiller unit showing whether the chiller is running or various temperatures, etc.

405 BMS Out-station controlling chilling—The BMS is comprised of many outstations each with its own function to control and/or monitor pieces of plant

407 Control outputs to AHU

409 Status inputs from AHU

411 BMS Out-station controlling fresh air supply
413 Physical temperature sensor—sensor cable of converting a measured temperature into a signal such as 0-10 v (or 3-20 mA) where the upper and lower limits are defined temperature levels and the values in between scale linearly
415 0-10 v input connected to $1^{st}$ floor ceiling temperature sensor
417 $1^{st}$ floor space temperature Register 8002 (read/only)—Modbus register address of 8002 assigned to the indicated temperature sensor
419 Modbus Register Read Control—Logic controlling the access and timing to the Modbus Read registers
421 Out-station control strategy logic and Modbus interface manager—Software designed to control the data traffic and avoid data collisions on the Modbus network
423 Modbus Register Map—A map of the agreed locations of the Modbus registers
425 Boiler Enable Register 8018 (write/only)—Boiler run-enable signal Modbus register at assigned address 8018
427 Digital signal 0-5 v where 5 v represents Boiler Enable—Physical digital signal across a ⅔-wire cable to the Boiler controls
429 Physical Boiler or heating plant
431 Physical heating pump speed control—Speed control is usually implemented as a 0-10 v or 3-20 mA signal to a variable frequency drive unit
433 0-10 v output to the variable frequency heating pump control—analogue control of the variable speed drive
435 Heating pump speed control Register 8020 (write/only)—assigned Modbus speed control Register at 8020
437 Modbus Register Write Control-Logic controlling the access and timing to the Modbus Write registers
439 Modbus over IP network—Actual physical network carrying the Modbus protocol The following blocks are contained in FIG. 4b:
451 Control Outputs to Chiller
453 Status inputs from Chiller
455 BMS Out-station controlling chilling/cooling
457 Control outputs to AHU
459 Status inputs from AHU
461 BMS Out-station controlling fresh air supply
463 Control outputs to heating system
465 Status inputs from physical heating system and space temperature sensors
467 BMS Out-station controlling heating is the physical BMS outstation that carries out the control and monitoring of the building's heating system On-Site Inventive System: This system is an integrated part of the Building Control system and operates as part of or alongside the existing BMS modules as shown
469 BMS live status monitor is a module that ensures that the connection to the Modbus over IP network or the Building Control Network is physically and logically present.
471 Modbus interface manager ensures the correct flow of messages to and from the Modbus or Control network.
473 BMS Interface manager—software module ensuring the interface to the BMS is managed in an orderly fashion
475 NTL, MHR and NCR calculation algorithms—software module using collected and downloaded data to calculate the thermal heating rates every 15 minutes
477 Schedule Files—calculated schedule files as determined by the continuous calculation of the thermal parameters based on recorded building data and the short-term weather forecast in 475
479 Temperature set-point files—calculated set-points for the heating system based on the results of the calculations in 475
481 Database—local database storing data as collected and downloaded
483 Internet or some IP public network
485 Weather forecast generator—data can be sourced from many generators of weather forecast data available on 15 minute intervals
487 Server Database—Master database and copies of all the local databases for many buildings
489 Status Reporting Web Service—Reporting and visualization section facilitating the creation of daily, weekly and monthly charts and reports for relating the energy management function
491 Heating system optimizer—software implementation of the material contained in this specification to determine the optimum set-points and schedule for building cooling on a 15 minute basis
493 Cloud-based replicas of on-site system algorithms Control Strategy and Protocol The control strategy is agreed with the BMS programmer and the register mapping is shared between the BMS and the new computer device. This allows the new computer device to read and write certain registers. As an illustration, let's say, the computer device reads all internal space temperatures and the BMS external temperature. With this data, the computer device can calculate the natural thermal lag for the building over a one day period. With these space temperature data and knowledge of the start and stop times for the heating system, the computer device can calculate the mechanical heat up rate (MHR) and night-time natural cooldown profile slope (NCR) which according to the MHR and NCR algorithms explained in this document, can result in the computer device writing to the heating plant ON register to enable the boilers. In this way, the computer device can influence the heating control strategy by bringing forward or pushing back the mechanical heating start-up time.

Several interlocks can be implemented between the computer device and the BMS. These ensure that the BMS knows the computer device is functional. If, for any reason, the computer device fails to respond to the regular 'are you alive' request from the BMS, the BMS will revert to the stored control strategy and its default operational schedules. In this way, in the event of computer device or communications failure, no down time should be experienced by the BMS or the building.

Test Building Implementation of Method

The method involving the various lags and profiles was implemented in a building in Western Europe. This building has been referred to as the test building or B1. B1 is a single-tenant premium office building located at a city-center business park. Arranged as six floors over basement carpark, it comprises almost 11,000 m² of usable office space (approximately 120,000 sqft) and is concrete constructed with columns and cast in-situ flooring slabs. The building would be considered a heavy building unlike a more conventional steel-framed building and with that weight comes a larger thermal mass—slow to heat up and slow to cool down. All lag calculations were performed manually in preparation for their implementation in an automated computerized system.

Commencing with the establishment of an energy usage benchmark or baseline, the various lags and profiles were observed during the first month without any energy efficiency interventions. During this time, several open-office spaces were monitored and the internal and external temperatures were recorded. This data provided guidance for the initial assessment of how the lags might be successfully applied to the operation of the building plant. Note that the lags and lag profiles have been developed as (1) high level indicators of building envelope thermal performance and (2) indicators of how the building envelope interacts with the installed plant. In the B1 building, they have been used to guide reduced plant operations specifically to generate better energy efficiency in the use of plant to provide agreed levels of occupant comfort.

The following sections outline the baseline establishment, the specific actions taken as a result of the lag calculations and finally, the results of this implementation are described.

P1 Energy Baseline

Before the energy reduction programme commenced, an energy usage baseline was agreed with the B1 building operator. After the operator had carefully considered the previous and following year's energy usage data and the weather experienced during these years, the figures from a typical full calendar year were selected as the most indicative of reasonable annual energy use. FIG. 5 shows the agreed baseline energy for electricity and natural gas in B1 over the course of this year. As a point of reference, the comparison is drawn in FIG. 6 between the CIBSE usage figures for a typical high-end office building, the CIBSE Good Practice usage figures and the actual usage figures in building B1 during the baseline year.

It is important to note that all units used in the implementation of the method for the B1 building and reported here are S.I. or metric units as that what is now customarily used in Europe by building and design personnel. Where possible, the equivalent units from the US Customary system have also been included.

Identifying Energy Reduction Opportunities

Prior to the commencement of the energy efficiency program, the B1 building was operated on a full 24/7 basis with all plant enabled to run most of the time. The BMS schedules, together with the control strategies and the daily space temperatures available on the BMS, were analysed in detail to determine the best opportunities for energy reduction. The following section outlines the conclusions reached from this analysis.

In order to determine the building's actual operational hours, it was suggested to security staff that an informal log might be kept of approximate staff numbers using the building late at night and over the weekends. These observations, over a two month period, showed that the building was lightly used overnight and at weekends, varying between 10 and 25 people at any time at weekends.

B1 Overheating

Prior to the commencement of the efficiency program, the amount of thermal energy being driven into the building from the B1 boilers far exceeded the tabulated average values from the CIBSE design and operation guidelines. According to CIBSE Guide A, thermal energy input to an office building should be in the vicinity of 210 kWh/m$^2$/yr for typical usage and 114 kWh/m$^2$/yr for good practice usage. B1 was consuming 347 kWh/m$^2$/yr during the course of 2010, based on a usable office space figure of 9,350 m$^2$ (approximately 100,000 sqft).

Likewise, electricity usage numbers were 350 kWh/m$^2$/yr, while the CIBSE usage guideline for typical office buildings was 358 kWhr/m$^2$/yr and 234 kWh/m$^2$/yr for good practice office buildings. The energy usage figures from CIBSE for typical office, good practice office and actual baseline year are shown in FIG. 6.

B1 Over-Chilling

Once the overheating issue was identified, the amount of chilling going into B1 also came under scrutiny. It was suspected that the over-heating of the building had a direct effect on the amount of chilling demanded by the individual fan coil units (FCU) on all floors. The BMS schedules for heating and chilling were examined and found to be running close to 24 hours per day.

It was reasonable to assume that the chiller schedule, starting at 2 a.m., was set up to avoid overheating during the early morning hours. If overheating could be reduced, the amount of chilling required might also be reduced.

B1 Oversupply of Fresh Air

The air handling units (AHU) were scheduled to run on a 24/7 basis. Given the B1 boilers were similarly scheduled, this meant the building was being supplied with tempered air at all times. Again an energy reduction opportunity presented itself based on the recommended fresh air flow in CIBSE Guide A at between 6 and 15 l/s/person (litres/sec/person), depending on the design parameters. This is almost identical to recommendations in ASHRAE Standard 55 for buildings in the USA. The four AHUs in B1, operating at full power, can deliver 28,000 l/s into the building. Significant losses in airflow are inevitable in the long non-linear ducts between AHU and office vents, but from the ventilation design, the fresh air supply is well in excess than that required for the current 500 occupants. The designers would have sized the AHUs for a maximum number of occupants, particularly in meeting rooms and open areas, such as the restaurant. With a reduced staff count at weekends, a reduced airflow is also possible. With the AHUs installed in B1, there was no mechanism to reduce the fan speeds—they are either on or off.

Changing B1 BMS from Demand Driven to Schedule Driven Operation

When first analysed, the BMS was found to have been programmed as a demand-driven system. The underlying assumption is that heating and cooling were available from the main plant at all times and one relies on the correct functionality of the local FCUs to use the heat and cooling resources as required.

One of the potential drawbacks of demand driven systems can manifest itself if FCUs are left permanently on or are malfunctioning. There is a possibility that a heating and/or cooling load could always exist, whether the space is in use or not. In any case, the fact that the boiler or chiller is enabled overnight will create a load just to keep these systems available in standby.

It was recognised early in the efficiency program, that substantially better control could be achieved if the BMS was changed from demand driven to time schedule driven. This would allow observation and confirmation of occupant comfort temperature compliance given various small and incremental changes to the delivered environment. In changing to a time schedule control strategy, a much finer level of control would be available and it would be possible to lower the amount of the heat delivered to B1 in a controlled manner. It was hoped the amount of chilling required by B1 could also decrease with the smaller amount of delivered heat. The calculation of the various lags and profiles were facilitated by this change from a demand to a schedule driven BMS strategy. The changes to plant operations suggested by these lags and profiles could also be more easily implemented with a schedule driven system.

Summary of B1 MHL and NCR Statistical Models

Following data collection from existing sources such as the BMS, newly installed monitoring equipment and observation, the following models were derived from this data. Data mainly comprised local external temperature, internal space temperatures, occupancy and energy usage by plant type (boiler). These data proved sufficient to complete the profile model calculations as indicated in FIG. 7. The two models were used to determine the best time to commence heating operations based on an 8-12 hour weather forecast, specifically external temperature. The models also informed the inventive system when it was possible to shut heating off for long or short periods, during the building's occupied hours.

Implementation of Energy Reduction Programme

The practical application of the material contained in this specification to the B1 building forms part of an overall energy efficiency program. Many measures were implemented simultaneously or following each other over a comparatively short timescale. This was done as it would prove commercially impossible to separate out all of the individual measures and accurately report on the reduction effects of each one. For this reason, the figures showing the energy usage reduction in the following sections are for the complete program, rather than just the implementation of the material contained in this specification. However, the use of the mechanical heating rate (MHR) and the natural cooling rate (NCR) both contributed to the dramatic changes in energy efficiency in the heating of the B1 building. Both MHR and NCR indices were used to determine the best time to run the heating systems and the duration they had to remain in operation given the 8-12 hour forecast outside environmental conditions.

The energy reduction programme has primarily focussed on the large plant and equipment. The first interventions concern the heating, chiller and ventilation schedules.

It is evident from the monthly usage figures in FIG. 8 that heating was dramatically reduced soon after interventions commenced.

FIG. 8 shows the improvement in heating volumes (kWh) due to the implementation of the efficiency program. Usage has dropped from typical CIBSE usage to below CIBSE Good Practice levels. The comparison with the CIBSE Good Practice figures is carried forward over a three-year period and FIG. 9 shows the improving usage figures to a point where both electricity and natural gas usage are below the Good Practice figures.

FIG. 10 shows the monthly comparison usage figures for total electricity usage comparing the benchmark year with a year at the end of the efficiency program.

Results of the Energy Reduction Programme

A number of important changes in BMS schedules and set-points resulted in reductions in energy use in B1. The analysis of heating and chilling patterns guided by the mechanical heat and cooling lags and the equivalent natural cooling lags, were also instrumental in identifying the inefficiencies which caused B1 to be over-supplied with both heat and chilling.

Concluding Remarks

The savings achieved in B1 represent an overall saving of 54% based on a direct comparison of total energy consumption figures over a three year period from before and after the energy efficiency program. It is clear that B1, as with many other buildings that have been examined, that substantial overheating was the norm. This in turn, caused substantial over-cooling to compensate. Both heating and cooling are expensive services in any western country and they should be limited to what is required for the building to provide a good working environment to occupants. When considering the quality of the thermal environment of any commercial building, there is nothing to be gained from overheating or overcooling.

Building plant has been sized to cater for the worst weather conditions and the maximum number of occupants. Whether these maximum conditions are ever met, is unclear, but equipment such as chillers, air handling units and boilers are very large consumers of power and gas and as such, they need to be controllable, rather than simply turned on and off The method described in this document, along with the lags described in U.S. Pat. No. 8,977,405 and publication no. US2015-0198961-A1 were applied to this building. This application resulted in substantial improvement and reduction of energy usage, while preserving occupant comfort, and in certain respects, such as air quality, improving it.

I claim:

1. A method that reduces thermal energy consumption of a commercial building while maintaining occupant comfort, said method providing improved control of heating systems wherein, for a building of interest, using Trend BMS Version 963 and Cylon BMS Version 2.1, and using an industry standard Modbus over IP communications protocol, performing the steps of:
    a) determining a natural thermal lag of said building;
    b) selecting a space within said building to observe internal space temperature;
    c) determining internal building space setpoint for a heating season;
    d) recording, for said building, heating system start-up time, space temperature at start-up time, time required to reach predetermined internal space temperature setpoint, external temperature data at preselected time intervals;
    e) determining using the recorded data, a mechanical heat-up rate (MHR) for each working day using an equation:

$$MHR_{p=1...N} = \{(T_{setpoint} - T_{SP_{t=0}})/t_{setpoint}\}_p$$

where $T_{setpoint}$ is the internal space temperature setpoint (usually 72° F.)
    $T_{SP_{t=0}}$ is the internal space temperature observed when the heating was started
    $t_{setpoint}$ is the time required to heat the space from the starting temperature $T_{SP_{t=0}}$ to the required setpoint $T_{setpoint}$;
    f) recording a plurality of average daily lagged external temperature for the day the MHR was calculated, where said lag is guided by the building's natural thermal lag to form a series of $MHR_{p=1...N}$ values for heating days 1 . . . N, and establishing a regression relationship which links the MHR to the average daily lagged external temperature and this is shown in generalized form in the following equation:

$$MHR_i = \beta_0 - \beta_1 ALaggedTout_i + \epsilon_i$$

wherein
    $MHR_i$ is the calculated mechanical heat-up rate on any given day i, on which the heating system is operating
    $\beta_0$ represents the intercept of the linear relationship between mechanical heating rate and lagged external temperature, as guided by the NTL, on the y-axis
    $\beta_1$ represents the slope of the relationship between $MHR_i$ and lagged average external temperature $ALaggedTout_i$ ALaggedTout$_i$ represents the value of average lagged external temperature, guided by NTL, and calculated for any given day i;

ε is the estimated variation;

g) recording, for a predetermined period of time, for said building, heating plant shut-down time, space temperature of preselected internal space at shut-down time, space temperature of preselected internal space at next heating plant start-up time, external temperature data at preselected time intervals;

h) deriving, from step g, internal space temperature changes as a function of the difference between internal space temperature and a lagged external temperature $$T_{SPi} = \beta_0 + \beta_1(T_{SPi} - \text{LaggedTout}_i) \pm \epsilon_i$$

wherein $T_{SPi}$ is internal space temperature at time i, $\beta_0$ is a Y axis intercept of an internal space temperature and a difference between an internal space temperature and an external lagged temperature, $\beta_1$ is a slope of a difference between an internal space temperature $T_{SPi}$ and an external lagged temperature LaggedTout$_i$ at time period i, LaggedTout$_i$ is a value of lagged external temperature, at time period i, ε is estimated variation;

i) determining a natural cooling rate (NCR), repeating the process outlined in step g calculating a plurality of NCR$_{p=1 \ldots N}$ values for days 1 ... N $$NCR_i = \beta_0 + \beta_1 A\text{LaggedTout}_i + \beta_2 AOcc_i \pm \epsilon_i$$

wherein

NCR$_i$ is a night-time natural cooling rate slope on day i, $\beta_0$ is a Y axis intercept of NCR and daily average lagged external temperature, $\beta_1$ is a slope of NCR$_i$ and daily lagged average external temperature ALaggedTout$_i$ ALaggedTout$_i$ is a value of daily average lagged external temperature calculated for day i $\beta_2$ represents the slope of the relationship between NCR$_i$ and daily average occupancy AOcc$_i$ ε is estimated variation;

j) gathering at preselected intervals weather forecast for a predetermined time period, said time period extending beyond an estimated winter natural thermal lag of said building;

k) calculating at a preselected time a lagged average external temperature over a time period commencing at time of heating plant shut-off;

l) recording internal space temperatures and external temperatures from time of heating plant shut-off time to a preselected time of step j, and applying step h;

m) determining, from step l and a predicted lagged external temperatures in a weather forecast, internal space temperatures for predetermined time periods;

n) determining mechanical heating rate for an average daily lagged external temperature using recorded external temperatures in conjunction with those from the weather forecast according to step e;

o) estimating a time to heat up, using mechanical heating rate for day i, a heating set point and an internal temperature from step l;

p) subtracting an estimated heat-up time from a preselected building occupancy start time, thereby determining a time to enable heating system;

q) controlling heating plant, by sending instruction to a building management system of said building to start heating system boilers and pumps.

2. The method of claim 1, further including the steps of:

r) recording and storing an observed 15-minute interval data for weather forecast, internal space temperatures and all other data used in the preceding steps to facilitate accuracy;

s) repeating steps i to v at a preselected interval to determine an optimum heating system activation time for a selected time of year.

* * * * *